US010521420B2

(12) United States Patent
Cunico et al.

(10) Patent No.: US 10,521,420 B2
(45) Date of Patent: Dec. 31, 2019

(54) ANALYZING SEARCH QUERIES TO DETERMINE A USER AFFINITY AND FILTER SEARCH RESULTS

(71) Applicant: International Business Machines Corporation, Armonk, NY (US)

(72) Inventors: Hernan A. Cunico, Holly Springs, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 14/814,634

(22) Filed: Jul. 31, 2015

(65) Prior Publication Data

US 2017/0031978 A1 Feb. 2, 2017

(51) Int. Cl.
*G06F 16/95* (2019.01)
*G06F 16/2452* (2019.01)
(Continued)

(52) U.S. Cl.
CPC ...... *G06F 16/24522* (2019.01); *G06F 16/248* (2019.01); *G06F 16/9535* (2019.01)

(58) Field of Classification Search
CPC ......... G06F 17/30669; G06F 17/30702; G06F 17/30867; G06F 17/30022–30044; G06F 16/3337–337; G06F 16/9535
See application file for complete search history.

(56) References Cited

U.S. PATENT DOCUMENTS 6,560,588 B1 * 5/2003 Minter ............... G06F 16/9535
706/50
8,832,132 B1 9/2014 Spertus et al.
(Continued)

FOREIGN PATENT DOCUMENTS

EP 2546763 A1 1/2013
EP 2546764 A1 1/2013
(Continued)

OTHER PUBLICATIONS

List of IBM Patents or Patent Applications Treated as Related, May 9, 2016, 1 page.
(Continued)

*Primary Examiner* — Robert W Beausoliel, Jr.
*Assistant Examiner* — Nirav K Khakhar
(74) *Attorney, Agent, or Firm* — Joseph Polimeni; Edell, Shapiro & Finnan, LLC (57) ABSTRACT

According to embodiments of the present invention, machines, systems, computer-implemented methods and computer program products for retrieving information pertaining to an affinity of a user are provided. In some embodiments, a search query is received from a user. The search query is analyzed to determine a bias of the user. The social media activity of the user is evaluated to determine affinity indicators for the user. Prior searches and selection of search results by the user is evaluated to detect patterns of the user. An affinity of the user is determined based on the bias, affinity indicators, and patterns. Initial search results are generated that satisfy the search query, and the initial search results are filtered based on the determined affinity of the user to produce search results in accordance with the determined affinity of the user.

4 Claims, 5 Drawing Sheets

(51) Int. Cl.
*G06F 16/248* (2019.01)
*G06F 16/9535* (2019.01)

(56) References Cited

U.S. PATENT DOCUMENTS

| | | | |
|---|---|---|---|
| 9,195,996 B1* | 11/2015 | Walsh | H04L 51/32 |
| 9,342,605 B2* | 5/2016 | Richter | G06F 17/30867 |
| 2003/0055786 A1 | 3/2003 | Smith, Jr. et al. | |
| 2008/0059455 A1* | 3/2008 | Canoy | G06F 17/30867 |
| 2010/0262454 A1 | 10/2010 | Sommer et al. | |
| 2011/0313994 A1* | 12/2011 | Varshavsky | G06F 17/30867 |
| | | | 707/707 |
| 2012/0041937 A1 | 2/2012 | Dhillon et al. | |
| 2012/0102050 A1* | 4/2012 | Button | G06F 17/30867 |
| | | | 707/749 |
| 2012/0166432 A1* | 6/2012 | Tseng | G06F 17/30867 |
| | | | 707/728 |
| 2012/0233142 A1 | 9/2012 | Lawrence | |
| 2012/0246054 A1 | 9/2012 | Sastri | |
| 2012/0310926 A1* | 12/2012 | Gannu | G06F 17/30702 |
| | | | 707/723 |
| 2013/0041653 A1* | 2/2013 | Tseng | G06Q 50/01 |
| | | | 704/9 |
| 2013/0238612 A1* | 9/2013 | Tsongas | G06F 17/30867 |
| | | | 707/723 |
| 2014/0095495 A1 | 4/2014 | Brukman et al. | |
| 2014/0372425 A1 | 12/2014 | Ayoub et al. | |
| 2015/0339754 A1* | 11/2015 | Bloem | G06F 17/30867 |
| | | | 705/26.7 |

FOREIGN PATENT DOCUMENTS

| | | |
|---|---|---|
| WO | 2004100525 A2 | 11/2004 |
| WO | 2013170344 A1 | 11/2013 |

OTHER PUBLICATIONS

Ahu Sieg et al., Web Search Personalization with Ontological User Profiles, International Conference on Information and Knowledge Management, Proceedings, Nov. 6-8, 2007, 525-534, Association for Computing Machinery, New York, United States.

* cited by examiner

ANALYZING SEARCH QUERIES TO DETERMINE A USER AFFINITY AND FILTER SEARCH RESULTS

BACKGROUND

1. Technical Field

Present invention embodiments relate generally to information mining, and more specifically, to analyzing a search query to determine a user affinity associated with the search query, and utilizing the user affinity to identify relevant search results.

2. Discussion of the Related Art

Search results from performing an online search, e.g., using a search engine site such as Google, Yahoo, etc., frequently retrieve information based upon the terms of a search query. If there is a conflict or rivalry between two political parties, the user may want to identify search results that are favorable to one of the two sides. However, in such scenarios, the search engine typically returns information matching the terms of the search query, without regard to the bias of the user. Accordingly, both positive and negative information is retrieved, leaving a user to manually parse through the search results in order to identify information in support of or against a particular affinity.

BRIEF SUMMARY

According to embodiments of the present invention, machines, systems, computer-implemented methods and computer program products for retrieving information pertaining to an affinity of a user are provided. In some embodiments, a search query is received from a user. The search query is analyzed to determine a bias of the user. The social media activity of the user is evaluated to determine affinity indicators for the user. Prior searches and selection of search results by the user is evaluated to detect patterns of the user. An affinity of the user is determined based on the bias, affinity indicators, and patterns. Initial search results are generated that satisfy the search query, and the initial search results are filtered based on the determined affinity of the user to produce search results in accordance with the determined affinity of the user.

These and other aspects, features and advantages of the present invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are examples and explanatory of preferred embodiments of the invention, and are not restrictive of the invention, as claimed.

BRIEF DESCRIPTION OF THE DRAWINGS

The disclosed embodiments may be better understood by referring to the figures in the attached drawings, as provided below. Generally, like reference numerals in the various figures are utilized to designate like components.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Current search engines do not utilize user affinity when delivering search results of a user search query. In some cases, a user may be interested in conducting a biased or polarized search, to identify information consistent with his/her opinions, beliefs, and/or viewpoints. For instance, a user may be interested in identifying not only news events pertaining to a political party, but also, may want to identify news events that are in favor of or against certain political groups. By determining the user affinity, the overall user experience when performing a search may be enhanced by providing selected information based upon a determined user affinity.

Figure 1:
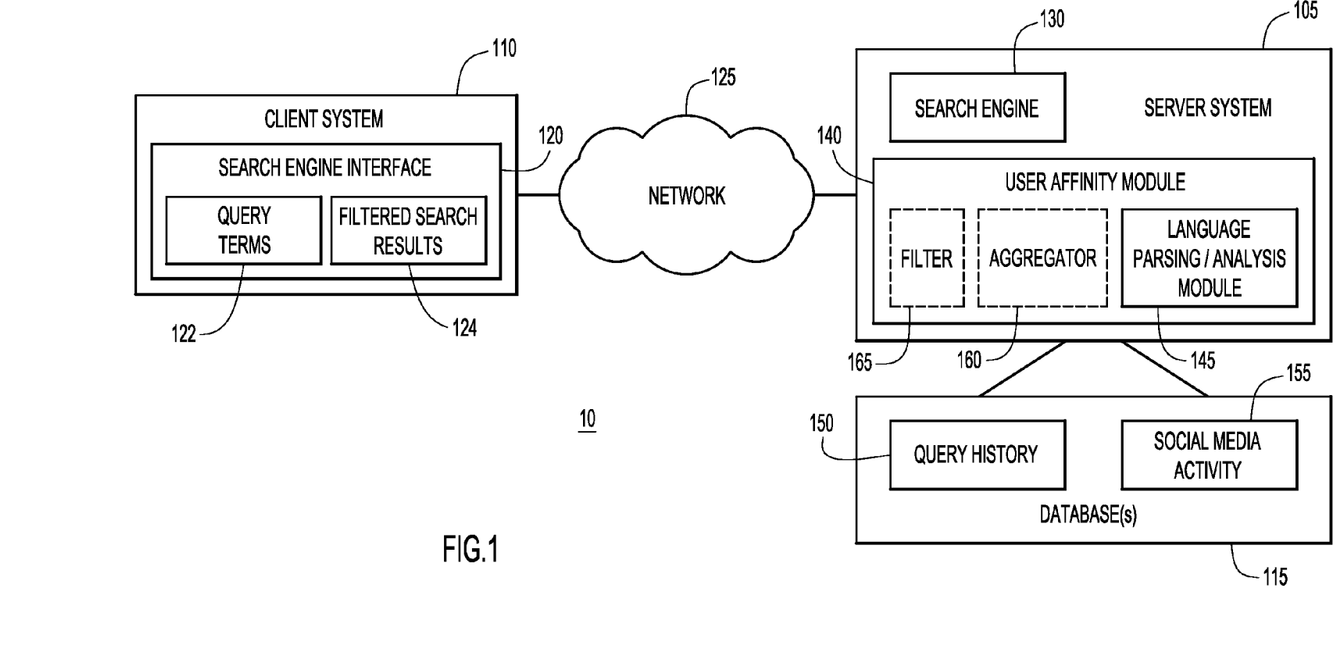
FIG. 1 is a block diagram showing an example information identification system in accordance with an embodiment of the present invention.

An example environment 10 for use with present invention embodiments is illustrated in FIG. 1. Specifically, the environment 10 includes one or more server systems 105, and one or more client or end-user systems 110. Server systems 105 and client systems 110 may be remote from each other and may communicate over a network 125. The network 125 may be implemented by any number of any suitable communications media (e.g., wide area network (WAN), local area network (LAN), Internet, Intranet, etc.). Alternatively, server systems 105 and client systems 110 may be local to each other, and communicate via any appropriate local communication medium (e.g., local area network (LAN), hardwire, wireless link, Intranet, etc.).

Client systems 110 enable users to input query terms 122 for search queries and to select and review the results from conducting the search. In general, a search query is comprised of one or more query terms; the search query is executed by the search engine 130 to identify sources of information pertaining to the terms of the search query. Client systems 110 may include a search engine interface 120. The search engine interface allows a user to access a web search engine 130, e.g., Google, Yahoo, etc., and to provide query terms 122 to the search engine 130 for the search. Once the search has been completed, the filtered search results 124 are presented to the user via the search engine interface 120. In some embodiments, the filtered search results 124 may be presented as a list of links to sources of information (e.g., news articles, blogs, commentaries, databases, etc.), and the user may click on a link to access the information associated with the link. The client systems 110 may present a graphical user (e.g., GUI, etc.) or other interface (e.g., command line prompts, menu screens, etc.) to solicit information from users pertaining to query terms 122, and may provide reports including filtered search results 124 (e.g., a filtered list of search results, etc.) to the user.

The server systems 105 include a user affinity module 140 to determine the affinity of a user and a search engine 130 to conduct the search based upon the search terms 122. In some aspects, the search engine 130 and the user affinity module 140 may reside on the same system or may distributed across multiple systems. Search engine 130 may be local to or remote from user affinity module 140.

One or more databases 115 may also be present, comprising user query history 150 and a user social media activity 155. The query history 150 may comprise information pertaining to previous searches conducted by a user. In some embodiments, the query history 150 comprises previously entered query terms 122 by a user. Additionally, query history 150 may comprise information indicating which particular filtered search results 124 a user accessed, e.g., by clicking on a corresponding link. In still other embodiments, the query history may comprise previous search queries and an associated timestamp indicating when the search was conducted, as well as determined affinities associated with each search query.

The database system 115 may store various types of information for the analysis (e.g., query history 150, social media activity 155, etc.). The database system 115 may be implemented by any conventional or other database or storage unit, may be local to or remote from server systems 105 and client systems 110, and may communicate via any appropriate communication medium (e.g., local area network (LAN), wide area network (WAN), Internet, hardwire, wireless link, Intranet, etc.).

Search engine module 130 receives the query terms 122 of the search query and utilizes the query terms to conduct the search. Search engine module 130 also provides the results of the search, e.g., a list of links, to the user. Examples of search engines include Google, Yahoo, etc.

User affinity module 140 may comprise a language parsing and analysis module 145, an aggregator 160, and a filter 165. Each are described below and throughout the specification.

Language parsing and analysis module 145 may utilize techniques for analyzing query terms 122 to determine a corresponding user sentiment (also referred to herein as a user bias), including Natural Language Processing Deep Parsing, Semantic Analysis and Sentiment Analysis, and other similar techniques. Techniques such as Natural Language Processing Deep Parsing, Semantic Analysis and Sentiment Analysis are well known in the art, and will not be covered in depth in this Specification. In general, language parsing technology evaluates the content, meaning and tone of phrases and/or words (e.g., a search query) to determine whether a positive or negative bias is present.

For example, if a user enters the query terms "Superior consumer rating for Ferrari", the language parsing and analysis module 145 may analyze these query terms and conclude that the user not only has an interest in sports cars but also has a positive bias for finding information in support of the Ferrari being a superior car, e.g., better performance, more luxurious, etc., as compared to other cars. A user bias generally refers to an inclination for (e.g., a predilection, liking, supporting of, etc.) or against (e.g., a dislike, antipathy, etc.) an opinion, position, object, etc. Accordingly, a positive bias is a bias supporting an opinion, position or object, while a negative bias is a bias that opposes the same.

In some embodiments, query terms 122 may be sparse (e.g., too few terms to accurately determine a user bias) or additional validation of the determined user bias may be desirable (e.g., to confirm a positive or negative user bias). In this situation, the language parsing and analysis module 145 may also analyze other sources of information provided by the user, e.g., social media activity 155, etc., in order to determine affinity indicators, which indicate a positive or negative bias with respect to a search query.

Social media activity 155 may include any type of information that is associated with a user's social media online presence, including user comments, posted and shared links to articles, favorite ("liked") web pages, user profile information (e.g., likes and favorites), channel subscriptions, frequently visited web sites, content that a user is actively following, etc. Language parsing and analysis module 145 may be used to analyze a user's social media content, to establish a meaning and tone of the social media activity/content, and to determine affinity indicators for distinguishing whether a user has a positive or negative bias regarding a search query. In general, an affinity indicator is content generated by a user that is polarized with respect to supporting or not supporting an opinion, belief, position or entity. For example, a comment on a social media website by the user stating that "Ferrari's are the best" would be a positive affinity indicator. The comment, as well as other social media content, may be analyzed by language parsing and analytics module 145 to determine a positive affinity for Ferraris, thereby verifying a positive bias for Ferraris as determined based upon the query terms. Accordingly, analysis of social media content by the user affinity module 140 may be used to validate the determined affinity. If the determined affinity was found to be negative, and the social media content pertaining to the query terms was also determined to have a negative affinity, then the determined affinity would be reinforced by the analysis of social media content.

As another example, if a user entered the term "Ferrari" as a single query term, the user affinity module 140 would not have enough information to determine whether a user has a positive or negative bias regarding Ferraris. Accordingly, the language parsing and analysis module 145 would need additional information, e.g., a user's social media activity 155 (or any other historical information generated by the user), in order to establish (e.g., based upon affinity indicators) whether a user has a positive or negative bias pertaining to the query term.

Accordingly, in some embodiments, the language parsing and analysis module 145 may access database 115, which comprises a user's prior social media activity 155. For example, in the event that a user has previously posted favorable comments regarding the car brand Ferrari within a social media website, the language parsing and analysis module 145 would determine that the user has a positive bias for the brand Ferrari. A comment on a social media website by the user stating that "Ferrari's are the best" would be a positive affinity indicator, and a user's bias may be determined based upon this additional information.

In other embodiments, the language parsing and analysis module 145 may analyze previous queries (e.g., query history 150, which may comprise query terms 122, associated determined affinities of each search query, and selected (filtered) search results) to determine patterns (of access by a user) with regard to a query term. For example, the terms of the current search query may be compared to the same or similar terms of previous search queries to establish whether a user has a positive or negative bias. For example, if the user has conducted multiple past searches with phrases, e.g., "Superior ranking of Ferrari" and/or "Ferrari 458 recognized as luxury sports car of the year", then the language parsing and analysis module 145 may determine that the user has a positive bias for "Ferrari", and in combination with the aggregator, may determine a positive bias for a specific brand of Ferrari, e.g., "Ferrari 458".

Aggregator 160 may aggregate different types of information, e.g., a user bias, affinity indicators, and patterns, determined by the language parsing/analysis module 145, to make a determination as to whether a user has an affinity for a particular idea, concept, opinion, or object. For example, if a user has searched many times for the term "Ferrari" and has selected links pertaining to Ferrari 458, then the information contained in query history 150 may be aggregated with the current query term "Ferrari", to return filtered search results pertaining to the phrase "Ferrari 458". Additionally, if the user has searched many times for "Ferrari 458 cost", then the aggregator may further aggregate information from past search queries to provide filtered search results pertaining to selling or buying a Ferrari 458.

Filter 165 may utilize information from aggregator 160 and language parsing and analysis module 145 to filter the results returned by search engine 130, in order to present the most relevant results to a user. For example, in some embodiments, the determined affinity of each search query (comprised of query terms 122) may be represented by a degree of scale (e.g., strong negative, negative, neutral, positive, strong positive, etc.) or a score value, e.g., ranging between −10 and 10, wherein scores between −10 to −6 are strong negative, scores between −5 and −1 are negative, a score of 0 is neutral, scores between 1 and 5 are positive, and scores between 6 and 10 are strong positive), based upon analysis by the language parsing and analysis module 145. Similarly, the search results returned from the search engine 130 may also be processed by language parsing/analysis module 145 to determine a corresponding affinity for each result. The determined affinity of a search query may be compared to the affinity of each search result, and matching affinities (between the search query and the search result) are displayed to create filtered search results 124 with a similar or the same affinity. These filtered search results 124 are then presented to the user. For example, if a search query was determined to be strong positive, then search results 124 that were also determined to be strong positive would be presented to the user.

As other examples, if a user is determined to have a positive affinity for Ferraris, then the filtered search results may comprise awards won, car races and events won, greatest innovations, all pertaining to Ferraris. If a user is determined to have a negative affinity for Ferraris, then the filtered search results may comprise recalls, defects, and negative reviews, all pertaining to Ferraris.

Figure 2A:
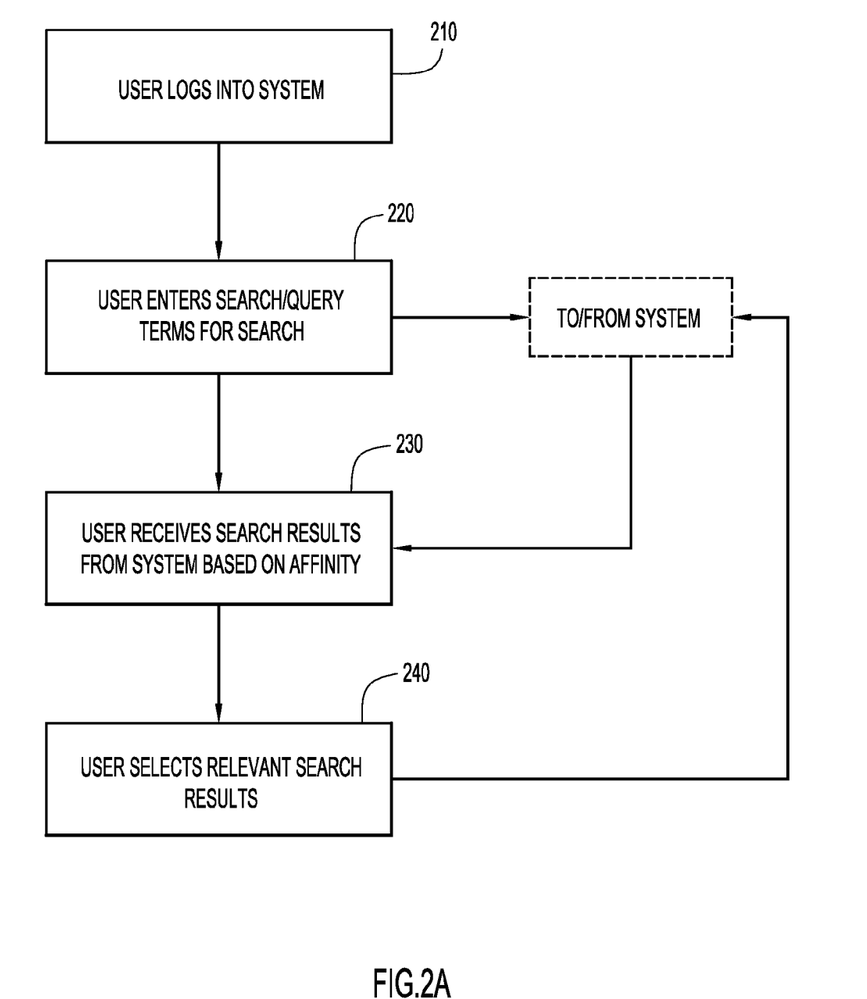
FIG. 2A is a procedural flow chart of identifying information based on a user affinity from the perspective of a client system in accordance with an embodiment of the present invention.

FIG. 2A refers to an example flow diagram pertaining to operations performed by a user at client systems 110 in accordance with embodiments of the present invention. At operation 210, a user may log into a system. At operation 220, a user may launch an interface to access a web search engine, e.g., Google, Yahoo, etc., and enter search query terms 122. Upon pressing a key (e.g., the enter key or equivalent), the query terms 122 are provided to server system 105, and the search is conducted by search engine 130. The query terms 122 may be stored in database 115 as part of query history 150. At operation 230, the user receives search results from server systems 105, wherein the presented search results correspond to a user's determined affinity. At operation 240, a user may select a portion of a total number of links to view. Information pertaining to which links are selected may be provided to server systems 105, to further refine user affinity.

Figure 2B:
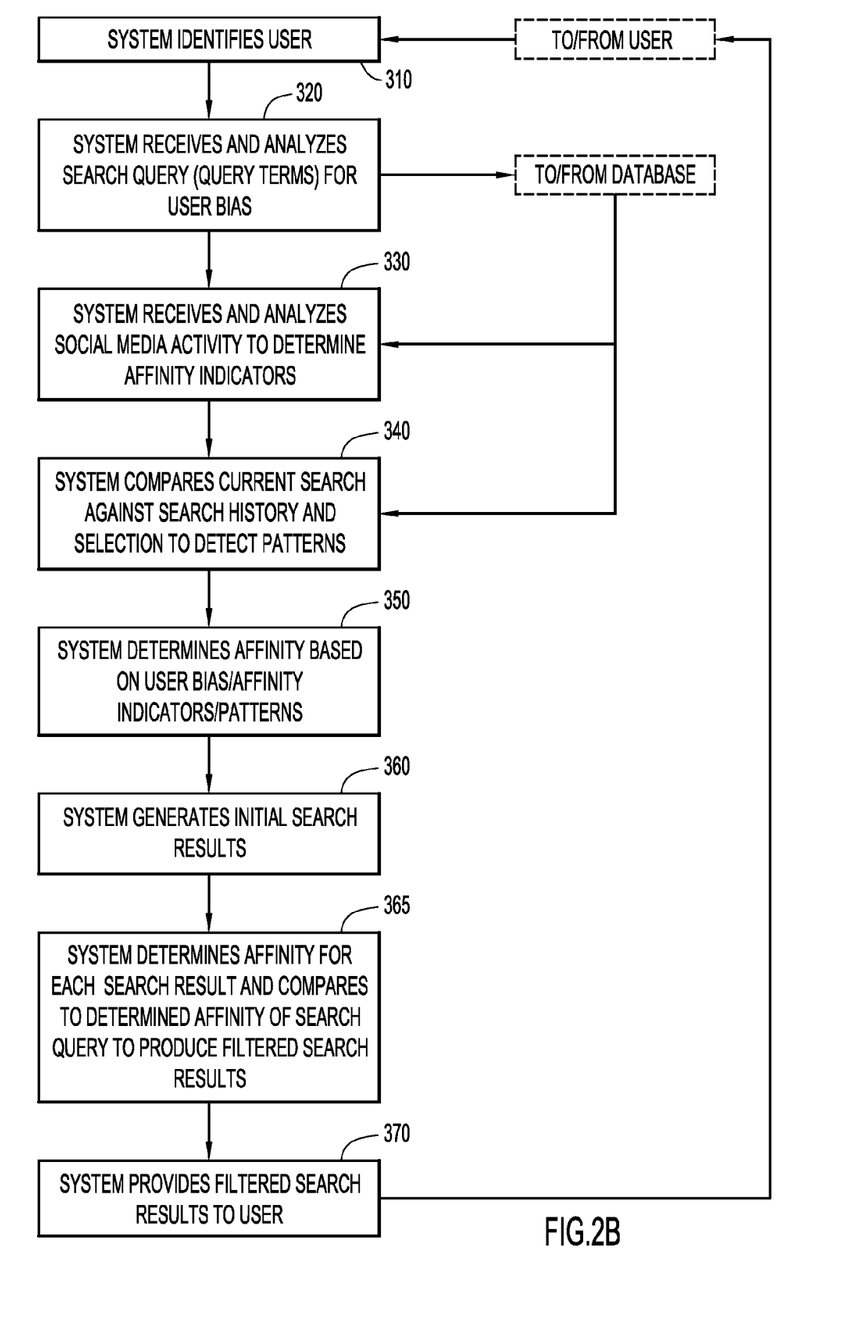
FIG. 2B is another procedural flow chart of identifying information based on a user affinity from the perspective of a server system in accordance with an embodiment of the present invention.

FIG. 2B refers to an example flow diagram pertaining to operations performed by server systems 105 in accordance with embodiments of the present invention. At operation 310, server systems 105 identifies a user. The user may be identified by login information or any other method for determining the identity of the user. At operation 320, the server system 105 receives search query terms 122 entered by the user, and the search query terms are analyzed for user bias by the user affinity module 140. In some aspects, query terms are analyzed with respect to presence of a tone or sentiment by user affinity module 140 to indicate that a bias is present. The received search terms may be stored in database 115, e.g., as part of query history 150. At operation 330, the server systems 105 receives and analyzes social media activity 155 to determine affinity indicators. Social media activity 155 may be stored in a database. At operation 340, server systems 105 compares current search terms against query history 150 as well as which results were selected by a user, in order to detect patterns pertaining to e.g., which information was accessed. Examples of patterns may include selecting links pertaining to a common type, e.g., a same brand of Ferrari, reports about Ferraris provided by a particular car magazine, and so forth.

At operation 350, the server systems 105 determines an affinity based upon user bias, affinity indicators and/or patterns. At operation 360, the server system 105 generates initial search results and filters the initial search results based upon the determined affinity. For example, in some embodiments, and as represented by operation 370, each search result may also be analyzed by language parsing/analysis module 145 and assigned an affinity score or value. The affinity score or value of each search result may be compared to the determined affinity of the search query to identify search results with a similar or the same score. At operation 380, the server system 105 provides the filtered search results to the user.

It is also understood, that as the system collects, analyzes, and stores more information pertaining to user affinity, the more accurate the relevancy of the filtered results that are presented to the user becomes.

Figure 3A:
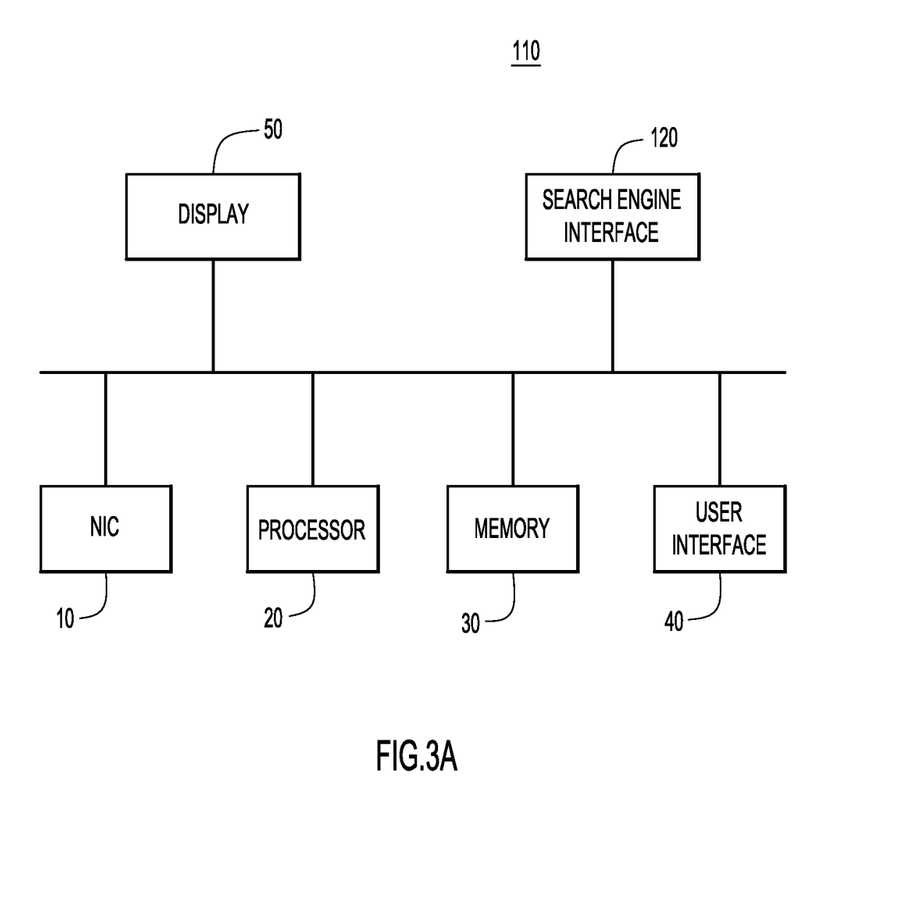
FIG. 3A is an example block diagram of the architecture of a client system in accordance with an embodiment of the present invention.

Referring to FIG. 3A, an example of client system 110 architecture is provided. Client system 110 may be implemented by any conventional or other computer systems preferably equipped with a display or monitor 50, a base (e.g., including at least one processor 20, one or more memories 30, and/or internal or external network interfaces or communications devices 10 (e.g., modem, network interface cards (NICs), etc.)), user interface 40 (e.g., a keyboard, computer mouse, microphone, camera/video, etc. or other input device with which to provide user input associated with performing activity/work), and any commercially available and custom software (e.g., server/communications software, search engine interface 120, browser software, etc.). All components are shown as being connected by a bus.

Figure 3B:
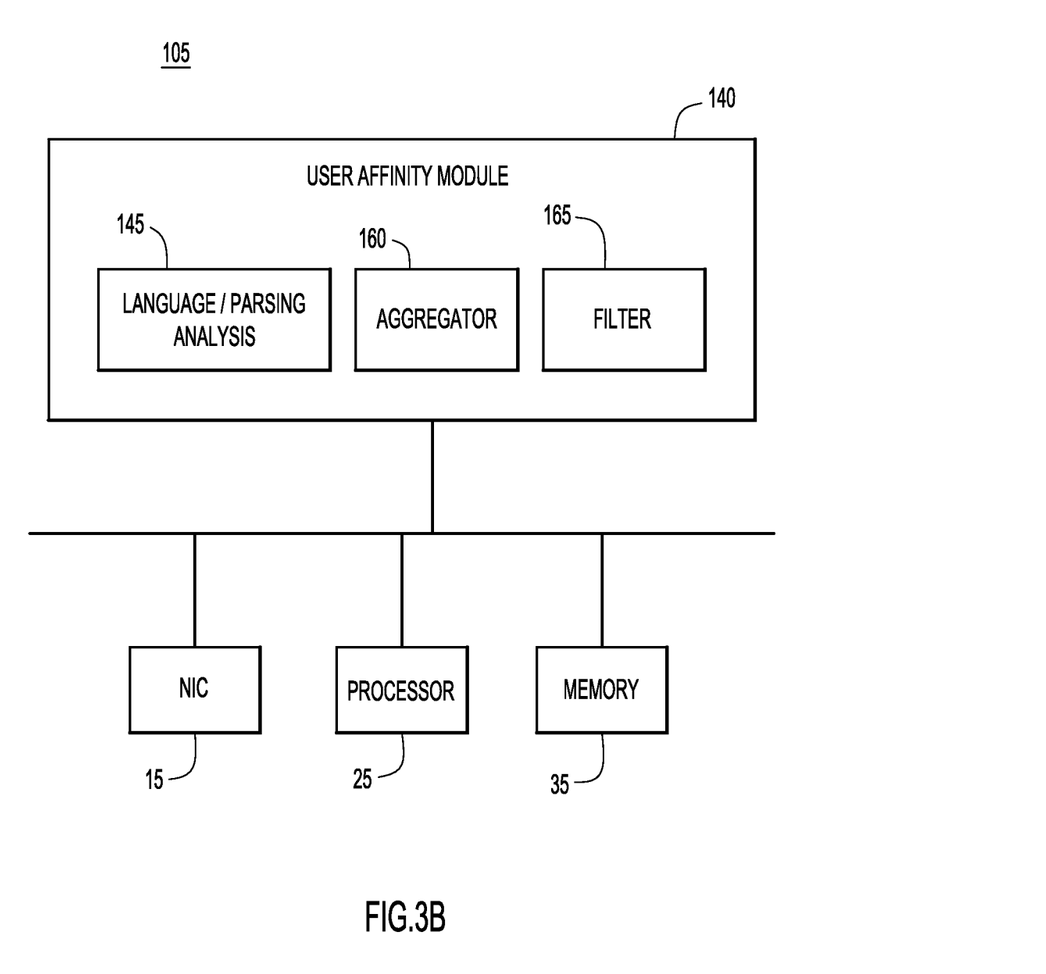
FIG. 3B is an example block diagram of the architecture of a server system in accordance with an embodiment of the present invention Features, elements, and aspects that are referenced by the same numerals in different figures represent the same, equivalent, or similar features, elements, or aspects, in accordance with one or more embodiments.

Referring to FIG. 3B, an example of server system 105 architecture is provided. Server system 105 may be implemented by any conventional or other computer systems preferably equipped with a base (e.g., including at least one processor 25, one or more memories 35, and/or internal or external network interfaces or communications devices 15 (e.g., modem, network interface cards (NICs), etc.)), and any commercially available and custom software (e.g., server/communications software, user affinity module 140, search engine 130, browser software, etc.). All components are shown as being connected by a bus.

User affinity module 140 may include one or more modules or units to perform the various functions of present invention embodiments described herein. The various modules (e.g., language parsing/analysis module 145, aggregator 160, filter 165) may be implemented by any combination of any quantity of software and/or hardware modules or units, and may reside within memory of the server and/or client systems for execution by the corresponding processor.

It will be appreciated that the embodiments described above and illustrated in the drawings represent only a few of the many ways of implementing embodiments for analyzing a search query to determine a user affinity.

The environment of the present invention embodiments may include any number of computer or other processing systems (e.g., client or end-user systems 110, server systems 105, etc.) and databases 115 or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, language parsing and analysis software, search engine software, etc.). These systems may include any types of monitors and input devices (e.g., keyboard, mouse, voice recognition, etc.) to enter and/or view information.

It is to be understood that the software (e.g., user affinity module 140 and its components, search engine 130 software and search engine interface 120 software, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., user affinity module 140 and its components, search engine 130 software and search engine interface 120 software, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., query terms 122, filtered search results 124, query history 150, social media activity 155, etc.). The database system may be implemented by any number of any conventional or other databases, data stores or storage structures (e.g., files, databases, data structures, data or other repositories, etc.) to store information (e.g., query terms 122, filtered search results 124, query history 150, social media activity 155, etc.). The database system may be included within or coupled to the server and/or client systems. The database systems and/or storage structures may be remote from or local to the computer or other processing systems, and may store any desired data (e.g., query terms 122, filtered search results 124, query history 150, social media activity 155, etc.).

The present invention embodiments may employ any number of any type of user interface (e.g., Graphical User Interface (GUI), command-line, prompt, etc.) for obtaining or providing information (e.g., query terms 122, filtered search results 124, query history 150, social media activity 155, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report regarding filtered search results 124 may include any information arranged in any fashion, and may be configurable based on rules or other criteria to provide desired information to a user (e.g., user affinity, etc.).

The present invention embodiments are not limited to the specific tasks or algorithms described above, but may be utilized generally for filtering search results to identify a context of the query terms. In other embodiments, the techniques described herein may be used for analyzing a user's query history to filter content (e.g., search results) in order to determine which returned content is most relevant.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for processing a search query comprising:
at least one processor configured to:
receive the search query from a user;
analyze query terms of the search query to determine a bias of the user based on content, and meaning and tone of any phrases and words included in the query terms;
store the query terms in a query history included in a database;
generate an affinity score of the user based on the determined bias, affinity indicators based on social media activity of the user included in the database, and patterns of the user based on prior searches of the user and search result selections by the user, the prior searches and the search result selections having been stored in the query history included in the database, the affinity score providing an indication of one of a positive affinity, a negative affinity and a neutral affinity, and a degree of scale of the affinity;
generate initial search results satisfying the search query;
generate an affinity score for each item in the initial search results; and
produce a final search result based on the generated affinity score for the each item in the initial search results, the final search result being in accordance with the affinity score of the user, wherein:
the final search result is customized for the user based on the bias of the user, the affinity indicators associated with the user, and the patterns of the user, and
as the system collects, analyzes, and stores information pertaining to user affinity, accuracy of a relevancy of the final search result increases.

2. The system of claim 1, wherein the social media activity includes one or more from a group of visited web sites, comments, likes, channel subscriptions, others followed by the user on social media, and others following the user on social media.

3. A computer program product for processing a search query, the computer program product comprising a computer readable storage medium having computer readable program instructions embodied therewith, the computer readable program instructions executable by a processor to cause the processor to:
receive the search query from a user;
analyze query terms of the search query to determine a bias of the user based on content, and meaning and tone of any phrases and words included in the query terms;
store the query terms in a query history included in a database;
generate an affinity score of the user based on the determined bias, affinity indicators based on social media activity of the user included in the database, and patterns of the user based on prior searches of the user and search result selections by the user, the prior searches and the search result selections having been stored in the query history included in the database, the affinity score providing an indication of one of a positive affinity, a negative affinity and a neutral affinity, and a degree of scale of the affinity;
generate initial search results satisfying the search query;
generate an affinity score for each item in the initial search results; and
produce a final search result based on the generated affinity score for the each item in the initial search results, the final search result being in accordance with the affinity score of the user, wherein:
the final search result is customized for the user based on the bias of the user, the affinity indicators associated with the user, and the patterns of the user, and
as information pertaining to user affinity is collected, analyzed, and stored, accuracy of a relevancy of the final search result increases.

4. The computer program product of claim 3, wherein the social media activity includes one or more from a group of visited web sites, comments, likes, channel subscriptions, others followed by the user on social media, and others following the user on social media.

* * * * *